United States Patent
Leyrer et al.

(10) Patent No.: US 7,214,421 B2
(45) Date of Patent: May 8, 2007

(54) OPTICAL DISPLAY ELEMENTS BASED ON AQUEOUS POLYMER DISPERSIONS

(75) Inventors: Reinhold J. Leyrer, Dannstadt (DE); Christoph Hamers, Ludwigshafen (DE); Holger Schoepke, Neckargemuend (DE); Helmut Ritter, Wuppertal (DE); Hartmut Loewen, Neuss (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 67 days.

(21) Appl. No.: 10/462,808

(22) Filed: Jun. 17, 2003

(65) Prior Publication Data

US 2004/0005453 A1    Jan. 8, 2004

(30) Foreign Application Priority Data

Jul. 2, 2002    (DE) ................ 102 29 732

(51) Int. Cl.
  *B32B 27/32*  (2006.01)
  *B32B 5/16*   (2006.01)
(52) U.S. Cl. .............. 428/323; 428/220; 428/327; 428/332
(58) Field of Classification Search .......... 428/220, 428/327, 332, 323
See application file for complete search history.

(56) References Cited

U.S. PATENT DOCUMENTS

| 3,733,371 | A  |   | 5/1973 | Kose et al. ............ 525/307 |
| 4,269,760 | A  | * | 5/1981 | Wakimoto et al. ...... 523/466 |
| 5,389,945 | A  | * | 2/1995 | Sheridan ............... 345/85 |
| 5,952,131 | A  |   | 9/1999 | Kumacheva et al. ..... 430/21 |
| 6,337,131 | B1 | * | 1/2002 | Rupaner et al. ........ 428/403 |

FOREIGN PATENT DOCUMENTS

| DE | 198 20 302 A 1 | 2/2000 |
| WO | WO 00/74927    | 12/2000 |
| WO | WO 01/62830    | 8/2001 |
| WO | WO 03/025035   | 3/2003 |
| WO | WO 03/044911   | 5/2003 |

OTHER PUBLICATIONS

E. Kumacheva, et al., Advanced Materials, vol. 11, No. 3, XP-000803280, pp. 231-234, "Three-Dimensional Arrays in Polymer Nanocomposites", Feb. 11, 1999.
O. Kalinina, et al., Macromolecules, vol. 32, No. 12, XP-000984727, pp. 4122-4129, "A "Core-Shell" Approach to Producing 3D Polymer Nanocomposites", 1999.

* cited by examiner

*Primary Examiner*—Sheeba Ahmed
(74) *Attorney, Agent, or Firm*—Oblon, Spivak, McClelland, Maier & Neustadt, P.C.

(57) ABSTRACT

Optical display elements comprising a layer made from a deformable material (matrix) and from discrete polymer particles whose distribution in the matrix follows a defined spatial lattice structure.

45 Claims, No Drawings

OPTICAL DISPLAY ELEMENTS BASED ON AQUEOUS POLYMER DISPERSIONS

The present invention relates to optical display elements comprising a layer made from a deformable material (matrix) and from discrete polymer particles whose distribution in the matrix follows a defined spatial lattice structure.

These are three-dimensional lattice structures, as are also present in crystals.

Optical displays increasingly use organic materials, which generally give advantages in handling.

When organic materials are used, optical signals are produced by utilizing a very wide variety of physical and chemical properties.

In liquid-crystal displays, the mode of action depends on a reorientation of the molecules in the electrical field, for example.

OLED (organic light-emitting diode) displays use light-emitting organic materials.

There is a desire to find alternatives to the optical display elements used hitherto and based on organic materials, the alternatives fulfilling as many as possible of the following requirements:
  easy accessibility of the organic material
  low-cost organic material
  problem-free disposal of the organic material
  simple functional principle of the display and therefore problem-free operation.

Optical displays based on organic materials and providing the above properties can also be used in large-surface-area applications, e.g. as an advertising panel.

Aqueous polymer dispersions are low-cost organic materials which are easy to prepare. DE-A 19717879 and DE-A 19820302 have disclosed that polymer dispersions are suitable for producing special-effect colorants.

It is an object of the present invention to provide optical displays based on organic materials which fulfill as many as possible of the above requirements.

We have found that this object is achieved by means of the optical display elements defined at the outset.

A substantial constituent present in the optical display elements is a layer made from a deformable material (matrix) and from discrete polymer particles whose distribution in the matrix follows a defined three-dimensional lattice structure.

The Polymer Particles

For formation of a defined three-dimensional lattice structure, the sizes of the discrete polymer particles are to be as near as possible identical. A measure of the uniformity of the polymer particles is what is known as the polydispersity index, calculated from the formula $$P.I.=(D_{90}-D_{10})/D_{50}$$

where $D_{90}$, $D_{10}$, and $D_{50}$ indicate particle diameters for which:

$D_{90}$: 90% by weight of the total weight of all of the particles has a particle diameter smaller than or equal to $D_{90}$
$D_{50}$: 50% by weight of the total weight of all of the particles has a particle diameter smaller than or equal to $D_{50}$
$D_{10}$: 10% by weight of the total weight of all of the particles has a particle diameter smaller than or equal to $D_{10}$ An example of other descriptions of the polydispersity index is found in DE-A 19717879 (in particular drawings page 1).

The particle size distribution may be determined in a manner known per se, e.g. using an analytical ultracentrifuge (W. Mächtle, Makromolekulare Chemie 185 (1984) pp. 1025–1039), and from this the $D_{10}$, $D_{50}$, and $D_{90}$ values may be taken, and the polyderdispersity index determined.

The polymer particles preferably have a $D_{50}$ value in the range from around 0.05 to 5 µm. The particles may be one type of particle or more than one type of particle with different $D_{50}$ values, but each type of particle has a polydispersity index which is preferably smaller than 0.6, particularly preferably smaller than 0.4, and very particularly preferably smaller than 0.3, and in particular smaller than 0.15.

In particular, the particles are composed of a single type of particle. The $D_{50}$ is then preferably from 0.05 to 2 µm, particularly preferably from 100 to 400 nanometers.

Polymer particles which in respect of the $D_{50}$ value are composed, for example, of two or three, preferably two, types of particle can also form a lattice structure together (crystallized) as long as the above condition in relation to the polydispersity index has been complied with for each type of particle. Examples of suitable mixtures are types of particle with a $D_{50}$ value of from 0.3 to 0.5 µm and with a $D_{50}$ value of from 0.1 to 0.3 µm.

The polymer particles are preferably composed of a polymer with a glass transition temperature of above 30° C., particularly preferably above 50° C., and particularly preferably above 70° C., in particular above 90° C.

The glass transition temperature may be determined by conventional methods, such as differential thermal analysis or differential scanning calorimetry (see, for example, ASTM 3418/82, "midpoint temperature").

The polymer is preferably composed of at least 40% by weight, with preference at least 60% by weight, particularly preferably at least 80% by weight, of what are known as main monomers.

The main monomers are selected from $C_1$–$C_{20}$-alkyl (meth)acrylates, vinyl esters of $C_1$–$C_{20}$ carboxylic acids, vinylaromatics having up to 20 carbon atoms, ethylenically unsaturated nitriles, vinyl halides, vinyl ethers of $C_1$–$C_{10}$ alcohols, aliphatic hydrocarbons having from 2 to 8 carbon atoms and one or two double bonds, or mixtures of these monomers.

Examples which may be mentioned are alkyl (meth)acrylates having a $C_1$–$C_{10}$-alkyl radical, for example methyl methacrylate, methyl acrylate, n-butyl acrylate, ethyl acrylate and 2-ethylhexyl acrylate.

Mixtures of the alkyl (meth)acrylates are in particular also suitable.

Examples of vinyl esters of $C_1$–$C_{20}$ carboxylic acids are vinyl laurate, vinyl stearate, vinyl propionate, vinyl versatate, vinyl acetate.

Vinylaromatic compounds which may be used are vinyltoluene, α- and p-methylstyrene, alpha-butylstyrene, 4-n-butylstyrene, 4-n-decylstyrene and preferably styrene. Examples of nitriles are acrylonitrile and methacrylonitrile.

The vinyl halides are chlorine-, fluorine-, or bromine-substituted ethylenically unsaturated compounds, preferably vinyl chloride and vinylene chloride.

Examples of vinyl ethers which may mentioned are vinyl methyl ether and vinyl isobutyl ether. Preference is given to a vinyl ether of alcohols containing from 1 to 4 carbon atoms.

As hydrocarbons having from 2 to 8 carbon atoms and one or two olefinic double bonds, mention may be made of butadiene, isoprene, and chloroprene, and while ethylene and propylene are examples having one double bond.

Preferred main monomers are the $C_1$–$C_{20}$-alkyl acrylates, in particular $C_1$–$C_8$-alkyl acrylates and $C_1$–$C_8$-alkyl meth-acrylates, vinylaromatics, in particular styrene, and mixtures of these, in particular also mixtures of the alkyl (meth) acrylates and vinylaromatics.

Very particular preference is given to methyl acrylate, methyl methacrylate, ethyl acrylate, n-butyl acrylate, n-hexyl acrylate, octyl acrylate and 2-ethylhexyl acrylate, and styrene, and also mixtures of these monomers.

The polymer particles preferably have chemical crosslinking. To this end, concomitant use may be made of monomers having at least two polymerizable groups, e.g. divinylbenzene or allyl methacrylate (internal crosslinking). However, crosslinkers may also be added (external crosslinking).

The Matrix

There should be a refractive-index difference between the matrix and the polymers.

The difference should preferably be at least 0.01, particularly preferably at least 0.1.

The higher refractive index here may be possessed either by the matrix or by the polymer. The decisive factor is the existence of a difference.

The matrix is composed of a deformable material. Deformability is understood to mean that the matrix permits spatial shifting of the discrete polymer particles when external forces are applied (e.g. mechanical, electromagnetic).

The matrix is therefore preferably composed of an organic material, or organic compounds with a melting point or a glass transition temperature below 20° C., particularly preferably below 10° C., very particularly preferably below 0° C. (at 1 bar).

Use may also be made of organic compounds with a melting point or a glass transition temperature (Tg) above 20° C., but in that case prior heating above the melting point or above the Tg is required if the separations of the polymer particles are to be changed (see below).

Liquids, such as water, or relatively high-viscosity liquids, such as glycerol or glycol, may be used.

Preference is given to polymeric compounds e.g. polycondensates, polyadducts, or polymers obtainable by free-radical polymerization.

Examples which may be mentioned are polyesters, polyamides, formaldehyde resins, such as melamine-formaldehyde condensates, urea-formaldehyde condensates, or phenol-formaldehyde condensates, polyepoxides, polyurethanes, or else the abovementioned polymers which contain the main monomers listed, e.g. polyacrylates, polybutadienes, styrene-butadiene copolymers.

The Preparation

Preparation methods are described in DE-A 19717879 and DE-A 19820302.

Preparation of the Discrete Polymer Particles

In one preferred embodiment, the discrete polymer particles or polymers are prepared by emulsion polymerization, and the polymer is therefore an emulsion polymer.

Emulsion polymerization is particularly preferred because this method can give polymer particles with a uniform spherical shape.

However, another example of a preparation method is solution polymerization followed by dispersion in water.

The emulsion polymerization method uses ionic and/or non-ionic emulsifiers and/or protective colloids, or stabilizers as surface-active compounds.

A detailed description of suitable protective colloids is found in Houben-Weyl, Methoden der organischen Chemie [Methods of organic chemistry], volume XIV/1, Makromolekulare Stoffe [Macromolecular materials], Georg-Thieme-Verlag, Stuttgart, 1961, pp. 411–420. Emulsifiers which may be used are either anionic, cationic or non-ionic emulsifiers. The surface-active substances preferably comprise emulsifiers whose molecular weight is usually below 2000 g/mol, in contrast to that of protective colloids.

The amounts usually used as the surface-active substance are from 0.1 to 10% by weight, based on the monomers to be polymerized.

Examples of water-soluble initiators for the emulsion polymerization are the ammonium and alkali metal salts of peroxydisulfuric acid, e.g. sodium peroxodisulfate, hydrogen peroxide, or organic peroxides, e.g. tert-butyl hydroperoxide.

The systems known as reduction-oxidation (redox) initiator systems are also suitable.

Redox initiator systems are composed of at least one, mostly inorganic, reducing agent, and of an inorganic or organic oxidant.

The abovementioned initiators for the emulsion polymerization are examples of the oxidation component.

Examples of the reduction components are alkal metal salts of sulfurous acid, e.g. sodium sulfite, sodium hydrogensulfite, alkali metal salts of disulfurous acid, such as sodium disulfite, bisulfite addition compounds of aliphatic aldehydes and ketones, such as acetone bisulfite, or reducing agents such as hydroxymethanesulfinic acid and its salts, or ascorbic acid. When the redox initiator systems are used, concomitant use may be made of soluble metal compounds whose metallic component can occur in more than one valence state.

Examples of conventional redox initiator systems are ascorbic acid/ferrous sulfate/sodium peroxodisulfate, tert-butyl hydroperoxide/sodium disulfite, tert-butyl hydroperoxide/Na hydroxymethanesulfinic acid. The individual components, e.g. the reduction component, may also be mixtures, e.g. a mixture of the sodium salt of hydroxymethanesulfinic acid and sodium disulfite.

The amount of the initiators is generally from 0.1 to 10% by weight, preferably from 0.5 to 5% by weight, based on the monomers to be polymerized. It is also possible to use two or more different initiators in the emulsion polymerization.

The emulsion polymerization generally takes place from 30 to 130° C., preferably from 50 to 90° C. The polymerization medium may be composed either entirely of water or else of mixtures of water and liquids miscible therewith, for example methanol. It is preferable to use only water. The emulsion polymerization may be carried out either as a batch process or else as a feed process, which includes a staged or gradient method. Preference is given to the feed process, in which some of the polymerization mixture forms an initial charge and is heated to the polymerization temperature and begins to polymerize, and then the remainder of the polymerization mixture is introduced to the polymerization zone continuously, in stages, or as required by a concentration gradient, usually via two or more spatially separated feeds, of which one or more comprise(s) the monomers in pure or emulsified form, so as to maintain progress of the polymerization. A polymer seed may also form an initial charge in the polymerization for better particle-size control, for example.

The average skilled worker is aware of the manner in which the initiator is added to the polymerization vessel during the course of the free-radical aqueous emulsion polymerization. All of the initiator may form an initial charge in the polymerization vessel, or else it may be used in a continuous or staged manner as required by its consumption in the course of the free-radical aqueous emulsion polymerization. The detail here depends on the chemical nature of the initiator system and also on the polymerization temperature. It is preferable for a portion to form an initial charge and for the remainder to be introduced to the polymerization zone as required by consumption.

Uniform particle size, i.e. low polydispersity index, is obtainable via the methods known to the skilled worker, e.g. by varying the amount of the surface-active compound (emulsifier or protective colloids) and/or appropriate stirrer speeds.

Initiator is also usually added after the end of the actual emulsion polymerization, i.e. after at least 95% conversion of the monomers, in order to remove the residual monomers.

The individual components may be added to the reactor during the feed process from above, at the side, or from below through the floor of the reactor.

The emulsion polymerization generally gives aqueous dispersions of the polymer, generally with solids contents of from 15 to 75% by weight, preferably from 40 to 75% by weight.

Preparation of the Polymer Particles/Matrix Mixture (Layer)

Water or Solvent as Matrix

The emulsion polymerization directly gives an aqueous dispersion of the polymer particles. The water may simply be removed sufficiently to obtain the lattice structure of the polymer particles, detectable from the color effects observed during the process.

If other solvents are desired, water may simply be exchanged for these solvents.

Polymeric Compounds as Matrix

The aqueous dispersion of the discrete polymer particles obtained during the emulsion polymerization may be mixed with that amount of the polymeric compound needed to obtain the lattice structure, and the water may then be removed. Since the viscosity of the polymeric compound is often high, it can be advantageous for the polymer particles first to be mixed with the structural components of the polymeric compound and then, after dispersion of the polymer particles, for these structural components to be reacted to give the polymeric compounds, e.g. via a condensation or addition reaction.

Emulsion Polymers as Discrete Polymer Particles and Emulsion Polymers as Matrix

The appropriate emulsion polymers may simply be mixed, and then the water may be removed. If the emulsion polymers for the matrix have a glass transition temperature below 20° C. (see above), the polymer particles form a film at room temperature and form the continuous matrix. Heating to temperatures above the Tg is required if the Tg is higher.

It is particularly suitable and advantageous to prepare both emulsion polymers in a single step, as a core-shell polymer. For this, the emulsion polymerization is carried out in 2 stages. The monomers which form the core (=subsequent discrete polymer particles) are first polymerized, and then the monomers which form the shell (=subsequent matrix) are polymerized in a 2nd stage in the presence of the core.

On subsequent removal of the water, the soft shell, whose glass transition temperature is below 20° C., forms a film, while the (hard) cores still present take the form of discrete polymer particles distributed in the matrix.

The polymeric compounds may also be crosslinked so that they have elastic properties. If crosslinking is desired, it preferably takes place during or after production of the film, for example via a thermally- or photochemically-initiated crosslinking reaction of a crosslinker, which is added or may have prior bonding to the polymer.

The crosslinking of the matrix creates a restoring force which acts on the discrete polymer particles. The polymer particles then assume the prescribed initial position without exposure to external forces.

The Structure of the Layer

The layer brings about an optical effect, i.e. an observable reflection via interference of the light scattered at the polymer particles.

The wavelength of the reflection here can be anywhere in the entire electromagnetic spectrum, depending on the separation of the polymer particles. The wavelength is preferably in the UV region, or IR region, and in particular in the visible light region.

The wavelength of the observable reflection depends, in compliance with the known Bragg equation, on the separation of the network planes, in this case the separation between the polymer particles arranged in a three-dimensional lattice structure within the matrix.

If the desired three-dimensional lattice structure is to be formed with the desired separation between the polymer particles, a particularly important factor is appropriate selection of the proportion of the matrix by weight. In the preparation methods described above, an appropriate amount of the organic compounds, e.g. polymeric compounds, should be used.

In particular, the proportion of the matrix by weight is judged so that the resultant three-dimensional lattice structure of the polymer particles reflects electromagnetic radiation in the desired region.

If a color effect is desired, i.e. a reflection in the visible light region, suitable separation between the polymer particles (in each case measured to the center of the particles) is from 100 to 400 nm.

The Optical Display Elements

The layer is normally present between substrates, at least one of these substrates being transparent.

An example of the latter is a transparent glass sheet or polymer film.

The incident light passes through the transparent substrate, and the reflected light preferably also passes through this transparent substrate.

The other substrate on the opposite side may therefore be a substrate with light transmittance smaller than 50%, e.g. a colored or black substrate, e.g. appropriately colored glass sheet or polymer film.

A Bragg reflection in the first crystal-lattice planes of the layer suffices for the optical effect. It is therefore also possible for the layer, in particular the relatively deep-lying planes, to have been colored, e.g. to be black.

The layer may also have been colored in order to create a desired underlying shade of color.

The thickness of the layer may preferably be from 1 to 150 µm, particularly preferably from 1 to 50 µm.

Optical signals are created by changing the separations of the polymer particles.

The wavelength of the reflected light in the optical display elements is therefore alterable via a change in the separation of the polymer particles. The alteration may take place by thermal, mechanical, electrical, magnetic, or electromagnetic means, or by utilization of the piezo effect, for example.

To this end, there are devices applied above and, where appropriate, below the layer which create appropriate thermal, mechanical, electrical, magnetic, or electromagnetic effects.

The separation of the polymer particles is preferably alterable spatially in a controlled manner. An example of a method used for this purpose is the subdivision of the layer into a raster field, where each point in the raster can be independently influenced and controlled by an appropriate device.

Images are thus created.

Movable images also result if there is time-based alterability and control.

An example of a method for controlled spatial and, where appropriate, time-based alterability of the separations of the polymer particles is the use of conductive elements applied to the upper and lower sides of the layer. In particular, there may be conductive elements running in parallel on one side of the layer and on the other side of the layer there may be elements applied which likewise run in parallel but conversely to the elements on the first side. Separate control of each element with opposing potential on the two sides can provide precise control of those regions of the layer which correspond to the intersections of the conductive elements. Independent spatial and time-based control of the separation of the polymer particles is therefore possible in the region of the intersections.

Another method for controlled spatial and, where appropriate, time-based alterability of the separations of the polymer particles is the use of transistors located on at least one side of the layer.

The following additional embodiments may also be indicated:

Crosslinked matrix Here, restoring forces act on the polymer particles. The polymer particles assume the initial positions without exposure to external forces. A crosslinked matrix is particularly suitable when, for example, the display is required to remain visible when switched off, without any energy requirement.

Matrix with melting point or Tg above 20° C. Prior to altering the separations of the polymer particles, the layer has to be heated above 20° C. At the higher temperature, external forces can then be used to alter separation. The condition of the material is frozen-in after cooling to 20° C. A matrix with Tg or melting point above 20° C. is therefore advantageous for a longlasting display with high stability, which nevertheless occasionally is changed.

The optical display elements of the invention can be used not only to produce colored images and films or images with integrated time-based alterability, but can also be used to produce monochromatic laser light or for the electromagnetically-based wavelength-dependent control of data-transmission devices.

The optical display elements are in particular also suitable for large-surface-area display panels, e.g. advertising panels, and the area of the displayed image here may be greater than 0.2 m², in particular greater than 0.5 m² or greater than 1 m².

Advantages of the optical display elements of the invention are easy accessibility, easy handling, low cost, and problem-free disposal of the organic material, and the simple functional principle and, associated therewith, problem-free operation of the displays, and low energy consumption.

EXAMPLES

Preparation of Polymers

The examples below illustrate the invention. The emulsifiers utilized in the examples have the following compositions:

Emulsifier 1:30% strength by weight solution of the sodium salt of an ethoxylated and sulfated nonylphenol having about 25 mol/mol of ethylene oxide units.

Emulsifier 2:40% strength by weight solution of a sodium salt of a $C_{12}/C_{14}$ paraffinsulfonate.

Emulsifier 3:15% strength by weight solution of linear sodium dodecylbenzenesulfonate.

The particle size distributions were determined with the aid of an analytical ultracentrifuge or with the aid of the capillary hydrodynamic fractionation method (CHDF 1100 particle size analyzer from Matec Applied Sciences), and the values obtained were used to calculate the P.I. value from the formula $$P.I.=(D_{90}-D_{10})/D_{50}$$

Unless otherwise stated, solutions are aqueous solutions.

The term pphm used in the examples means parts by weight, based on 100 parts by weight of all monomers.

The meanings of the abbreviations used for monomers are: AA=acrylic acic, n-BA=n-butyl acrylate, DVB=divinylbenzene, EA=ethyl acrylate, MAA=methacrylic acid, MAMol=N-methylolmethacrylamide, NaPS=sodium persulfate.

Example 1

Preparation of an Emulsion Polymer

A dispersion of 0.9 g (0.20 pphm) of polystyrene seed (particle size: 30 nm) in 500 ml of water forms an initial charge in a glass reactor provided with anchor stirrer, thermometer, gas-inlet tube, dropping funnel, and reflux condenser, and is heated, with stirring, in a heating bath while at the same time the air is displaced by introducing nitrogen. When the heating bath has reached the preset temperature of 85° C. and the reactor contents have the temperature of 80° C., the nitrogen feed is interrupted and an emulsion of 445.5 g of styrene (99.0% by weight), 4.5 g of divinylbenzene (1.0% by weight) and 14.5 g of emulsifier 1 (1.0 pphm) in 501.3 ml of water is added dropwise simultaneously with 54.0 g of a 2.5% strength by weight aqueous solution of sodium persulfate (0.3 pphm) over the course of 3 hours. Once feed of the solutions is complete, the polymerization is continued for a further 7 hours at 85° C. and the mixture is then cooled to room temperature.

The dispersion has the following properties:

| | |
|---|---|
| Solids content: | 29.6% by weight |
| Particle size: | 255 nm |
| Coagulum content: | <1 g |
| pH: | 2.3 |
| Polydispersity index: | 0.13 |
| Refractive index: | 1.59 |

This example is repeated a number of times, varying the concentration of the seed particles. Table 1 below gives an overview of the experimental results obtained.

TABLE 1

| | Ex. Number | | | | | | |
|---|---|---|---|---|---|---|---|
| | 1A | 1B | 1C | 1D | 1E | 1F | 1G |
| Seed conc. % by weight | 0.20 | 0.15 | 0.10 | 0.053 | 0.30 | 0.53 | 3.16 |
| Solids content % by weight | 28.8 | 28.4 | 28.5 | 29.4 | 29.3 | 30.0 | 28.6 |
| Part. size [nm] | 256 | 280 | 317 | 357 | 222 | 188 | 125 |
| P.I. | 0.13 | — | — | 0.19 | — | — | 0.221 |

Example 2

Preparaton of an Emulsion Polymer with Core-Shell Structure 300 g of the core particles obtained in Example 1A form an initial charge in a glass reactor provided with anchor stirrer, thermometer, gas-inlet tube, dropping funnel, and reflux condenser, and are heated in a heating bath while the air is simultaneously displaced by introducing nitrogen.

When the heating bath has reached the preset temperature of 85° C. and the reactor contents have reached 80° C., the nitrogen feed is interrupted, and a) a mixture of 84.7 g (98.0% by weight) of n-butyl acrylate, 0.86 g (1.0% by weight) of acrylic acid, 5.76 g (1.0% by weight) of a 15% strength by weight solution of N-methylolmethacrylamide, 2.86 g of a 31% strength by weight solution (0.97 pphm) of emulsifier 1 and 12.4 g of water are added dropwise simultaneously with b) 17.3 g of a 2.5% strength by weight aqueous solution of sodium persulfate (0.5 pphm)

over the course of 1.5 hours.

Once feed of the solution is complete, the polymerization is continued for a further 3 hours at 85° C. The resultant dispersion of core-shell particles is then cooled to room temperature.

The dispersion has the following properties:

| | |
|---|---|
| Solids content: | 40.6% by weight |
| Particle size: | 307 nm |
| Polydispersity index (PI): | 0.16 |
| Core:shell weight ratio: | 1:1 (calculated) |
| Shell polymer refractive index | 1.44 |

This example is then repeated twice, varying the concentration of the core particles and the core-shell weight ratio. Table 2 below gives an overview of the experimental results obtained.

TABLE 2

| Ex. number | 2A | 2B | 2C |
|---|---|---|---|
| Core proportion (parts by weight) | 100.0 | 133.3 | 225.0 |
| n-BA [% by weight] | 98.0 | 98.0 | 98.0 |
| AA (% by weight] | 1.0 | 1.0 | 1.0 |
| MAMol [% by weight] | 1.0 | 1.0 | 1.0 |
| Shell:core ratio | 1:1 | 0.75:1 | 0.44:1 |
| Particle size [nm] | 301 | 308 | 284 |
| P.I. | 0.162 | 0.137 | 0.144 |
| Solids content [% by weight] | 39.4 | 40.6 | 35.2 |

% by weight values for n-BA, AA, and MAMol are based on the shell.

Production of a Reflective Layer

Example 3A 15 g of the dispersion obtained in Example 2A are dried at room temperature in a silicone rubber dish. This gives a layer with rubber-like elasticity and with a bright special-effect color. If this is heat-conditioned at 120° C. in a vacuum oven for 1 hour and then cooled to room temperature its elasticity increases further and a slight alteration in color is apparent. When the layer is stretched its color changes with the stretching ratio, from brown via green through violet.

Example 3B 135 g of the dispersion obtained in Example 2A are mixed with 15 g of a fine-particle 20% strength by weight aqueous dispersion of a copolymer of 94% by weight of ethyl acrylate and 6% by weight of methacrylic acid, with a median particle size of 30 nm and a glass transition temperature of about 0° C., and the mixture is dried at room temperature in a silicone rubber shell. This gives a layer which has a special-effect color and is even more mechanically stable than the layer obtained in Example 3A. The example illustrates that addition of copolymer facilitates and improves film production.

Example 3C 20 g of the dispersion obtained in Example 2A are mixed with 2 g of diethylene glycol diethyl ether (DGDE), and the mixture is diluted with 10 g of water and dried at room temperature in a silicone rubber shell. This gives a layer which is even more mechanically stable than the layer obtained in Example 3A and has a bright special-effect color. The example shows that the addition of the DGDE also permits the shell polymers to produce a film, even at room temperature, while having only a slight effect on the color of the filmed layer.

Example 4

15 g of the dispersion obtained in Example 2C are dried in a silicone rubber shell at room temperature by permitting the water to evaporate. The resultant layer which has a bright special-effect color is then heat-conditioned at 120° C. for 1 hour in a vacuum oven and then cooled to room temperature. This gives a hard, mechanically stable, transparent film which has a bright color, which alters with the angle of illumination and observation. The hardness of the layer can be reduced as required by adding a fine-particle dispersion of soft material as in Example 3B and/or by adding plasticizers as in Example 3C, so that when the layers are stretched or compressed the colors alter as in Example 3A.

Example 5

If the particle size of the seed used in Example 2A is altered, i.e. instead of seed 1A use is made of seed 1D, for example, the perceived color of the films produced as in Example 3A shifts to the longer-wavelength region of the color spectrum. Correspondingly, use of a smaller seed particle, such as seed 1G, shifts the perceived color of the layers obtained as in Example 3A to the shorter-wavelength region of the color spectrum.

Example 6

Emulsion Polymer (as Polymer Particles)

Water (465 g) forming an initial charge and 6% of monomer emulsion ME1 are heated in a pilot-plant mixer with anchor stirrer (100 rpm) to 85° C. under nitrogen and treated with 22% of a solution of 4.8 g of sodium persulfate in 187 g of water. After 15 min the introduction of the remaining monomer emulsion ME1 in 2 h is begun, as is the introduction of the remainder of the initiator solution continuously in 2.25 hours. The mixture is then held at 85° C. for a further hour, cooled, and treated, in succession, with 16 g of a solution of tert-butyl hydroperoxide and a solution of ascorbic acid, the strength of each solution being 10% by weight. The resultant dispersion is free from coagulum and speck material and has a pH of 4.4, an LD value of 52%, a weight-average particle size of 236 nm (light scattering), and a solids content of 39.1%. The particle size distribution is monodisperse with a maximum at 242 nm and a P.I. of 0.24 (CHDF).

Composition of Monomer Emulsion ME 1
384 g of n-butyl acrylate
400 g of acrylonitrile
16 g of acrylic acid
14 g of emulsifier 2
529 g of water.

Example 7

Emulsion Polymers (as Matrix or as Polymer Particles in Water as Matrix)

333 g of water and 0.5% of the monomer emulsion ME2 form an initial charge and are heated in a pilot-plant mixer with anchor stirrer (100 rpm) to 80° C. under nitrogen and treated with 70 g of a 2.5% by weight aqueous solution of sodium persulfate. After 15 min, the feed of the remaining monomer emulsion ME2 and of a further 300 g of initiator solution continuously in 4 hours is begun. The mixture is then treated with 0.25 pphm of hydrogen peroxide and, over the course of an hour, is treated with a solution of 5.6 g of mercaptoethanol in 30 g of water. After cooling, concentrated ammonia solution is used to adjust the pH to 6.8. The product is filtered via a 120 μm filter and gives a medium-viscosity dispersion free from coagulum and from speck material and having an LD value of 24%, a weight-average particle size of 550 nm (light scattering), and a solids content of 60.6%. The particle size distribution is monodispersed with a maximum at 440 nm (CHDF). While standing in a glass vessel, the polymer dispersion gives marked crystallization on the wall, discernible from the formation of colored lamellar crystals which are not easily removed.

Composition of ME 2:
1701 g of n-butyl acrylate
91 g of acrylonitrile
18 g of acrylic acid
122 g of N-methylolmethacrylamide, 15% by weight
61 g of emulsifier 3
270 g of water.

Example 8

Mixing of 2 Emulsion Polymers 50 g of the dispersion from Example 6 are treated with 10 g of the dispersion from Example 7 and 20 g of water and stirred for 5 min. The mixture is allowed to dry at 25° C. in a rubber mold (14×14 cm). After 24 h a flexible white non-transparent film with marked surface crystallization has formed. The film exhibits prominent angle-dependent interference phenomena. On heat-conditioning (60 min at 60° C.), a transparent, yellow polymer matrix forms.

Example 9

20 g of the dispersion prepared in Examples 2A are mixed, with stirring, with 10 ml of water and 0.4 g of a black colorant, such as Lurazol Black from BASF Aktiengesellschaft, used in the form of a 9.44% strength by weight aqueous solution. The resultant colored dispersions were dried in silicone rubber shells (7×15 cm) at room temperature over the course of about 48 hours.

Optical Displays

Example 10

If, as in the prior art, the rubbery layer of thickness 3 μm obtained in Example 3A or 9 is provided on both sides with raster-type transparent electrodes applied to a soft transparent polymer film, and an electrical potential is applied to the raster points, the color of the layer alters at the regions subject to potential. The perception of color of the display with the color layer from Example 3A is markedly enhanced if the transparent film on one side of the display is replaced by a black film or a film with another color.

Example 11

If the thickness of the color layer as in Example 10 is halved, the electrical potential applied to create a perceived color can also be halved. Surprisingly, the potential which has to be applied to achieve a perceived color is almost independent of the resolution of the image, i.e. of the size of the raster points.

Example 12

If the electrical potential applied is altered over time, the perceived color created by the color layer here also alters.

The softer the color layer between the transparent electrodes as in Examples 3B, 3C and 4, the smaller the time delay for the color change.

We claim:

1. An optical display element comprising a layer which comprises
   a deformable material,
   discrete polymer particles distributed in a defined spatial lattice structure in said deformable material, and
   one or more articles affixed to the deformable material to apply at least one field selected from the group consisting of a thermal, electrical, and piezoelectric field to said layer,
   wherein said defined spatial lattice structure causes one or more wavelengths of the electromagnetic spectrum to be reflected from said layer and thereby display an image, and
   wherein said one or more wavelength of the electromagnetic spectrum reflected from said layer is altered by altering the separation of said discrete polymer particles by applying at least one of a thermal, electrical, and piezoelectric field, to said layer.

2. An optical display element as claimed in claim 1, wherein said discrete polymer particles comprise one or more types of particle with a median particle diameter in the range from 0.05 to 5 µm, and each type of particle has a polydispersity index (PI) smaller than 0.6, wherein said polydispersity index is represented by the formula $$P.I.=(D_{90}-D_{10})/D_{50}$$

wherein
$D_{90}$ is the particle diameter wherein 90% by weight of the total weight of all of the particles has a particle diameter smaller than or equal to $D_{90}$
$D_{50}$ is the particle diameter wherein 50% by weight of the total weight of all of the particles has a particle diameter smaller than or equal to $D_{50}$
$D_{10}$ is the particle diameter wherein 10% by weight of the total weight of all of the particles has a particle diameter smaller than or equal to $D_{10}$.

3. The optical display element as claimed in claim 2, wherein the polydispersity index is smaller than 0.3.

4. An optical display element as claimed in claim 1, wherein said discrete polymer particles comprise a single type of particle.

5. An optical display element as claimed in claim 1, wherein said discrete polymer particles comprise two types of particle.

6. An optical display element as claimed in claim 1, wherein one or more polymers comprised in said discrete polymer particles have a glass transition temperature above 30° C.

7. An optical display element as claimed in claim 1, wherein said discrete polymer particles are comprised of at least 40% by weight of monomers selected from the group consisting of $C_1$–$C_{20}$-alkyl (meth)acrylates, vinyl esters of $C_1$–$C_{20}$ carboxylic acids, vinylaromatics having up to 20 carbon atoms, ethylenically unsaturated nitriles, vinyl halides, vinyl ethers of $C_1$–$C_{10}$ alcohols, aliphatic hydrocarbons having from 2 to 8 carbon atoms and one or two double bonds, and mixtures thereof.

8. An optical display element as claimed in claim 1, wherein the refractive index of said discrete polymer particles differs from that of said deformable material.

9. An optical display element as claimed in claim 8, wherein the refractive index difference is at least 0.01.

10. An optical display element as claimed in claim 1, wherein said deformable material comprises a compound which has a melting point or a glass transition temperature below 20° C.

11. An optical display element as claimed in claim 1, wherein said deformable material is a polymeric compound.

12. An optical display element as claimed in claim 1, wherein said discrete polymer particles are obtained by polymerizing one or more compounds or one or more monomers capable of being polymerized in water by a free-radical or metal-catalyzed route in the presence of a surface-active compound.

13. An optical display element as claimed in claim 1, wherein said discrete polymer particles comprise the core of core-shell polymers and said deformable polymer comprise the shell of said core-shell polymers.

14. An optical display element as claimed in claim 1, wherein the separation between said discrete polymer particles is from 100 to 400 nanometers.

15. An optical display element as claimed in claim 1, further comprising two substrates wherein said layer is comprised between said two substrates, and wherein at least one of said two substrates is transparent.

16. An optical display element as claimed in claim 15, wherein one of said two substrate has a light transmittance smaller than 50%.

17. An optical display element as claimed in claim 1, wherein said layer is colored.

18. An optical display element as claimed in claim 1, wherein the thickness of said layer is from 1 µm to 150 µm.

19. An optical display element as claimed in claim 1, wherein the separation between said discrete polymer particles is capable of being altered in a controlled manner in space and in time.

20. An optical display element as claimed in claim 1, wherein the separation between said discrete polymer particles is capable of being altered point-by-point by one or more conductive elements applied to the upper and lower sides of said layer.

21. An optical display element as claimed in claim 1, wherein one or more transistors have been applied to at least one side of said layer.

22. The optical display element as claimed in claim 1, wherein the article is in direct contact with the deformable material.

23. An optical display element comprising a layer which comprises
   a deformable material,
   discrete polymer particles distributed in a defined spatial lattice structure in said deformable material, and
   one or more articles affixed to the deformable material to apply at least one of a thermal, electrical, magnetic, electromagnetic, or piezoelectric field to said layer,
   wherein the polymer particles consist of a polymer consisting of one or more polymerized monomer units selected from the group consisting of an unsubstituted ethylenically unsaturated monomer, an ethylenically unsaturated monomer substituted with a hydrocarbon group, and combinations thereof;
   wherein said defined spatial lattice structure causes one or more wavelengths of the electromagnetic spectrum to be reflected from said layer and thereby display an image, and
   wherein said one or more wavelength of the electromagnetic spectrum which is reflected from said layer is altered by altering the separation of said discrete polymer particles by applying a thermal, electrical, magnetic, electromagnetic, or piezoelectric field, to said layer.

24. An optical display element as claimed in claim 23, wherein said discrete polymer particles comprise one or more types of particle with a median particle diameter in the range from 0.05 to 5 μm, and each type of particle has a polydispersity index (PI) smaller than 0.6, wherein said polydispersity index is represented by the formula $$P.I.=(D_{90}-D_{10})/D_{50}$$

wherein $D_{90}$ is the particle diameter wherein 90% by weight of the total weight of all of the particles has a particle diameter smaller than or equal to $D_{90}$ $D_{50}$ is the particle diameter wherein 50% by weight of the total weight of all of the particles has a particle diameter smaller than or equal to $D_{50}$ $D_{10}$ is the particle diameter wherein 10% by weight of the total weight of all of the particles has a particle diameter smaller than or equal to $D_{10}$.

25. An optical display element as claimed in claim 23, wherein said discrete polymer particles comprise a single type of particle.

26. An optical display element as claimed in claim 23, wherein said discrete polymer particles comprise two types of particle.

27. An optical display element as claimed in claim 23, wherein one or more polymers comprised in said discrete polymer particles have a glass transition temperature above 30° C.

28. An optical display element as claimed in claim 23, wherein said discrete polymer particles are comprised of at least 40% by weight of monomers selected from the group consisting of $C_1$–$C_{20}$-alkyl (meth)acrylates, vinyl esters of $C_1$–$C_{20}$ carboxylic acids, vinylaromatics having up to 20 carbon atoms, ethylenically unsaturated nitriles, vinyl halides, vinyl ethers of $C_1$–$C_{10}$ alcohols, aliphatic hydrocarbons having from 2 to 8 carbon atoms and one or two double bonds, and mixtures thereof.

29. An optical display element as claimed in claim 23, wherein the refractive index of said discrete polymer particles differs from that of said deformable material.

30. An optical display element as claimed in claim 29, wherein the refractive index difference is at least 0.01.

31. An optical display element as claimed in claim 23, wherein said deformable material comprises a compound which has a melting point or a glass transition temperature below 20° C.

32. An optical display element as claimed in claim 23, wherein said deformable material is a polymeric compound.

33. An optical display element as claimed in claim 23, wherein said discrete polymer particles are obtained by polymerizing one or more monomers capable of being polymerized in water by a free-radical or metal-catalyzed route in the presence of a surface-active compound.

34. An optical display element as claimed in claim 23, wherein said discrete polymer particles comprise the core of core-shell polymers and said deformable polymer comprise the shell of said core-shell polymers.

35. An optical display element as claimed in claim 23, wherein the separation between said discrete polymer particles is from 100 to 400 nanometers.

36. An optical display element as claimed in claim 23, further comprising two substrates wherein said layer is comprised between said two substrates, and wherein at least one of said two substrates is transparent.

37. An optical display element as claimed in claim 36, wherein one of said two substrate has a light transmittance smaller than 50%.

38. An optical display element as claimed in claim 23, wherein said layer is colored.

39. An optical display element as claimed in claim 23, wherein the thickness of said layer is from 1 μm to 150 μm.

40. An optical display element as claimed in claim 23, wherein the separation between said discrete polymer particles is capable of being altered in a controlled manner in space and in time.

41. An optical display element as claimed in claim 23, wherein the separation between said discrete polymer particles is capable of being altered point-by-point by one or more conductive elements applied to the upper and lower sides of said layer.

42. An optical display element as claimed in claim 23, wherein one or more transistors have been applied to at least one side of said layer.

43. The optical display element as claimed in claim 23, wherein the one or more articles apply at least one field selected from the group consisting of a thermal field, electrical field, and piezoelectric field to said layer, and wherein said one or more wavelength of the electromagnetic spectrum which is reflected from said layer is capable of being altered by altering the separation of said discrete polymer particles by applying at least one of a thermal field, electrical field, and a piezoelectric field, to said layer.

44. The optical display element as claimed in claim 24, wherein the polydispersity index is smaller than 0.3.

45. The optical display element as claimed in claim 23, wherein the article is in direct contact with the deformable material.

* * * * *